2,931,727

PROCESS FOR PRODUCING A CONCENTRATED COFFEE EXTRACT

Theodore Kraut, Englewood, N.J., assignor to General Foods Corporation, New York, N.Y., a corporation of Delaware No Drawing. Application May 17, 1956
Serial No. 585,381

6 Claims. (Cl. 99—71)

This invention relates to improvements in the production of concentrated coffee extracts.

In the water extraction of ground roasted coffee the smaller the size of each coffee particle the greater the rate of extraction of desirable coffee solids from the particle. However, in many instances the presence of very small coffee particles in a bed of ground roasted coffee can lead to high back pressures necessitating employment of high water pressures to insure adequate continuous flow through the bed. This in turn leads to other difficulties which may eventually occasion stopping an operation prematurely before all of the desired solids are extracted and result in the appearance of undesirable fines and sediment in the concentrated extract and brew of cup coffee prepared therefrom. Thus, so-called "fines" are not themselves undesirable but in combination with larger coffee particles they can create pressure drop problems such as packing and channeling in the extracting chamber.

Particularly in the percolation of ground roasted coffee by the circulation of water at various temperatures through an elongated zone of such coffee, these fines can increase the pressure drop in the zone in a number of ways. Fines evenly distributed in a grind of coffee can reduce the porosity of a bed thus calling for high water pressure to be applied. The cross-sectional area of the vessel containing the bed also varies the extent to which the bed is compressed by its own weight and the degree by which fines therein can contribute to high back pressures leading to pressure drop difficulties in a column. The initial wetting of a bed of ground coffee containing fines swells the particles and thereby can reduce the voids space and increase the degree to which fines therein can interfere with the passage of water. The velocity of the extract in the percolation zone and the concentration of the extract recovered can also affect the degree to which fine particles are migrated and hence collect and pack in a bed to cause back pressures in a percolator column. The occurrence of such pressure drop problems due to the presence of fines is often unpredictable and the cause difficult to trace and to correct. Solution of any such problem by sifting the coffee particles to separate and discard the fines material is a wasteful process.

It is an object of this invention to provide a process whereby ground roasted coffee containing substantial quantities of fine material can have readily extracted therefrom substantially all of the water soluble coffee solids without such pressure drop problems and whereby the extract is provided in a shorter period of time with a high concentration of coffee solids in a condition free of fines and sediments.

It has now been discovered that much of the aforementioned difficulty in the percolation of roasted coffee can be reduced by forming the "fines" fraction of a coffee grind into pellets having a size substantially larger than the coarse particles of the grind and distributing said pellets at spaced points throughout the coarser grind fractions. This process immobilizes the fines in the dry state prior to extraction and positions them in the form of separate masses at spaced points distributed throughout the bed of coarser coffee particles in the extraction zone. The fines remain immobilized as they become wetted in which condition they do not tend to migrate. As a result of this process channeling and packing in the extracting chamber is reduced and there is provided a higher concentration of soluble coffee solids in the extract in a shorter period of time and in a condition substantially free of fines and sediment. This procedure permits a finer grind of coffee to be percolated without troublesome pressure drops and thereby provides a higher rate of extraction. This higher concentration of soluble coffee solids minimizes losses in quality of the extract caused by too long a period of percolation and exposure to high extraction temperatures.

The fines fraction, viz., particles passing through a #20 standard U.S. wire mesh screen, can be pelletized under pressure by themselves or the fines can have blended therewith a small quantity of dried coffee extract which when moistened provides a bond for the fines. Although moist coffee extract is the preferred bonding agent, a number of other non-coffee substances can be employed as bonding agents, viz., polyhydroxy compounds such as higher polyhydric alcohols like sorbitol and mannitol; monosaccharides like the ketones fructose and sorbose; the aldoses glucose and galactose; disaccharides like lactose and maltose; and other polysaccharides. The use of a dried coffee extract or similar bonding agent permits low pressures to be employed in pelletizing the fines thereby avoiding large amounts of heat being developed by the higher pressures otherwise necessary which can impart undesirable flavor to the fines and in turn to the extract.

In any event, the distribution of fines in the form of relatively large pellets throughout the remaining particles of roasted coffee in the percolator positions the fines in a relatively immobilized state at least in the initial percolation cycles and the fines are localized therefore in the voids space between the coarser coffee particles leaving the remaining voids space in a relatively open condition which minimizes clogging and channeling in the extraction chamber.

A typical roasted coffee grind for extraction comprises 45% retained on a #12 U.S. standard mesh screen, 45% retained on a #24 screen and about 10% passing the #24 screen. The first two fractions comprise a typical coarse coffee grind fraction as referred to herein. The latter fraction is typical of a fines fraction which is pelletized. This fines fraction can be pelletized by means of a variety of apparatus such as an extruding die, a tabletting press and the like. As indicated above the fines fraction is preferably mixed with a dried powdered coffee extract and moistened to permit the extract to bond the fines together. The dried extract should constitute from 10–15% by weight of the total blend of extract and fines, and is preferably moistened by steam bled into the mixture. The moistened blend provides a plastic meal which is readily extruded through 3/8" die holes or thereabout and is then cut into pellet lengths in the order of 3/8" to 1/2". The pellets are then cooled and dried in a cyclone air drier to solidify them in which condition they have a "cork-like" appearance.

The pellets thus provided are easily handled, substantially dry-to-the-touch, and can be distributed throughout a bed of coarse coffee particles by blending them into a stream of the aforesaid coarse ground coffee fraction as the extraction chamber is filled. The pellets have been combined with the described coarse coffee fraction in the ratio of about 3–25% by weight of the total column load, although 6 to 13% by weight is the preferred level.

Substantial quantities of coffee particles having particle sizes of the order of those passing a #20 U.S. standard mesh screen and ranging down to those retained on a #80 screen, when pelletized and distributed throughout coarser coffee particles have been percolated without encountering significant pressure difficulties. Generally the amount of fines used and their size range is primarily dependent on the extent to which they can be distributed in the coarse fractions without commingling substantially with fines in other areas of the bed. While the total pressure across a bed might tend to increase as a function of the increased quantities of fines material in pellet form, the balance of the void space in the bed, being substantially free of fines, compensates for any such tendency. The proportion of fines in pellet form which can be used increases as the average particle size of the grind decreases up to a point at which the unpelletized coffee itself introduces prohibitive pressures. Fines material of a size less than that retained on a #20 U.S. standard mesh screen has been pelletized and employed successfully at 30% of the total load of coffee without introducing prohibitive pressures in 10″ diameter percolator columns. The coarse particles in the latter case were of a size substantially retained on #20 screen with little retained on a #8 screen. Overall, though fines material of any size relative to the coarse grind fraction enables reduction in the period required to percolate a desirably flavored extract, the avoidance of troublesome pressure drops generally results when fines having a particle size less than that size which is retained on a #20 U.S. standard mesh screen is pelletized and distributed in the coarse particles in accordance with the invention.

In the present process concentrated coffee extracts are produced which have a coffee character like that of freshly brewed coffee beverages prepared in the conventional manner by the housewife from ground roasted coffee. The process is operative over a wide range of temperature conditions in large size percolator columns. Thus, the process is applicable to commercial scale countercurrent extraction processes employing a series of large diameter tubular columns filled with the pellets and ground roasted coffee.

It will be understood that while the invention has been described in part by means of specific examples reference should be had to the appended claims for a definition of the scope of the invention.

What is claimed is:

1. A process for producing a concentrated coffee extract from ground roasted coffee containing fines by the circulation of water at elevated temperatures through an elongated zone of such coffee which comprises separating the fines fraction from said coffee, forming said fines into pellets having a size substantially larger than the size of the particles forming the coarse fraction of such coffee, distributing the pelletized fines throughout the coarse fraction of said coffee in an elongated extracting zone to immobilize the pelletized fines in separate masses located at spaced points in the extraction zone at least in the initial stages of percolation whereby the fines are localized in part of the voids space between the coarser coffee particles while leaving the remaining voids space unoccupied, and water extracting the soluble coffee solids from the distributed ground coffee in said chamber.

2. A process according to claim 1, wherein said fines are blended with a bonding agent and moistened, and the blend is formed into said pellets.

3. A process according to claim 1, wherein said fines are blended with a quantity of moist coffee extract, and the blend is formed into said pellets.

4. A process according to claim 1, wherein said fines have a particle size substantially passing a number 20 U.S. standard wire mesh screen.

5. A process according to claim 4, wherein said fines are blended with dried coffee extract, and the blend is moistened and formed into said pellets.

6. A process according to claim 5, wherein the dried coffee extract comprises from 10–15% by weight of the blend of the fines and dried coffee extract.

References Cited in the file of this patent

UNITED STATES PATENTS

| | | |
|---|---|---|
| 1,637,648 | Kopf | Aug. 2, 1927 |
| 1,641,446 | McColl | Sept. 6, 1927 |
| 1,762,690 | Kopf | June 10, 1930 |
| 2,134,276 | Roscher et al. | Oct. 25, 1938 |